(12) United States Patent
Gamache et al.

(10) Patent No.: US 12,247,679 B2
(45) Date of Patent: Mar. 11, 2025

(54) SELF-SEALING HOSE

(71) Applicant: The United States of America, as represented by the Secretary of the Navy, Arlington, VA (US)

(72) Inventors: Raymond Mark Gamache, Salinas, CA (US); Christopher Marc LeTorre Phifer, Grosse Pointe, MI (US)

(73) Assignee: The United States of America as Represented by the Secretary of the Navy, Arlington, VA (US)

( * ) Notice: Subject to any disclaimer, the term of this patent is extended or adjusted under 35 U.S.C. 154(b) by 447 days.

(21) Appl. No.: 17/736,914

(22) Filed: May 4, 2022

(65) Prior Publication Data

US 2022/0356966 A1    Nov. 10, 2022

Related U.S. Application Data

(60) Provisional application No. 63/184,191, filed on May 4, 2021.

(51) Int. Cl.
*F16L 11/12* (2006.01)
*F16L 11/20* (2006.01)

(52) U.S. Cl.
CPC ............... *F16L 11/12* (2013.01); *F16L 11/20* (2013.01)

(58) Field of Classification Search
None
See application file for complete search history.

*Primary Examiner* — Yan Lan
(74) *Attorney, Agent, or Firm* — Scott Bell; Heber Martin Carbajal Chavez (57) ABSTRACT

A self-sealing hose includes an inner rubber layer comprising a first rubber material; and an outer rubber layer comprising a second rubber material. The second rubber material has an ultimate strain of at least 100% and an elastic limit of at least about 7 MPa. The first rubber material has a modulus measured at 250% elongation of less than about 10 kPa.

14 Claims, 9 Drawing Sheets

SELF-SEALING HOSE

CROSS-REFERENCE TO RELATED APPLICATIONS

The present application claims priority to U.S. Provisional Patent Application Ser. No. 63/184,191, filed May 4, 2021, which is incorporated by reference herein in its entirety.

BACKGROUND

Since World War I, the application of self-sealing was introduced primarily in the field of aviation where fuel tanks punctured by bullets/fragments could lead to catastrophic failure through both fire and loss of fuel during flight. The initial technology incorporated two outer layers that were resistant to the fuels sandwiching a polymer that expands when exposed to fossil fuels. Recent developments in new fuels, for aviation applications, may require that self-sealing systems cannot rely on reactivity with the fuel system to enable material expansion. New designs require two-part reactants separated by a membrane which enables mixing when a perforation occurs, without exposure to fuels. Both the increased complexity and size may create additional issues for fuel storage systems.

In addition to fuel tank self-sealing technologies, a similar vulnerability exists for fuel hose systems. The developed technologies for the fuel tank systems can be applied to the fuel hose applications but an increased risk of fuel line blockage exists. Current fuel lines can incorporate existing self-sealing technologies but the internal throughput diameter size must be increased to address the internal expansion from a self-sealing reaction.

It would be desirable to develop new self-sealing hoses, including such hoses with higher internal throughput diameter size.

BRIEF DESCRIPTION

The present disclosure relates to a self-sealing hose including an inner rubber layer and an outer rubber layer. When the self-sealing hose is penetrated by a projectile, the inner rubber layer material fills in regions of the outer rubber layer where gaps exist due to the penetration.

Disclosed, in some embodiments, is a self-sealing hose including an inner rubber layer comprising a first rubber material; and an outer rubber layer comprising a second rubber material. The second rubber material has an ultimate strain of at least 100% and an elastic limit of at least about 7 MPa. The first rubber material has a modulus measured at 250% elongation of less than about 10 kPa.

The first rubber material may have a glass transition temperature of less than about −20° C.

In some embodiments, the second rubber material includes a polyurea.

The second rubber material may include a polythiourea.

In some embodiments, the second rubber material has an elastic modulus in a range of about 500 kPa to about 3,000 kPa.

The second rubber material may have an ultimate stress in a range of about 15 to about 45 MPa.

In some embodiments, the ultimate strain of the second rubber material is in a range of 100% to about 500%.

The second rubber material may have a glass transition temperature of at least about −65° C.

In some embodiments, the self-sealing hose consists of the inner rubber layer and the outer rubber layer.

The inner rubber layer may be in direct physical contact with the outer rubber layer.

In some embodiments, the first rubber material includes a latex.

The first rubber material may include a vulcanized ethylene propylene diene monomer (EPDM) rubber in a thermoplastic matrix of polypropylene.

In some embodiments, the first rubber material comprises a latex or a vulcanized EPDM rubber in a thermoplastic matrix of polypropylene; and the second rubber material comprises a polyurea or a polythiourea.

The inner diameter of the hose may be at least about 0.5 inches; and the outer diameter of the hose may be less than or equal to about 1.385 inches.

However, it should be understood that the thickness and other dimensions of the hose may vary depending on threats the hose is designed against. In some embodiments, the inner diameter of the hose is between about 0.25 and about 1 inch. The outer diameter of the hose may be in a range of about 1 to about 5 inches.

Disclosed, in other embodiments, is a process for producing a self-sealing hose. The process includes applying an outer rubber layer comprising a second rubber material to an inner rubber layer comprising a first rubber material. The second rubber material has an ultimate strain of at least 100% and an elastic limit of at least about 7 MPa. The first rubber material has a modulus measured at 250% elongation of less than about 10 kPa.

In some embodiments, the inner rubber layer comprises a fluoropolymer elastomer, such as a fluorinated hydrocarbon rubber (e.g., VITON® from DuPont). This material may be used alone or in combination with the other inner rubber layer materials described herein.

In other embodiments, a third rubber layer in included internal to the inner rubber layer containing the fluorinated hydrocarbon rubber or other rubber material which is resistant to oil or another material to be transported through the hose. In these embodiments, the inner rubber layer may not require chemical resistance to oil or the other transported material.

The outer rubber layer may be applied by spraying the second rubber material onto the inner rubber layer while the inner rubber layer is rotated on a rotating rod.

In some embodiments, the outer rubber layer is applied by spraying the second rubber material into a mold that holds the inner rubber layer. The outer rubber layer materials may also be applied by pouring them within the mold.

Disclosed, in further embodiments, is a self-sealing hose including an inner rubber layer having an inner modulus and an inner elongation greater than about 500%; and an outer rubber layer having an outer modulus greater than about 300 psi and greater than the inner modulus, and having an outer elongation between about 100% about 300%.

The outer rubber layer may contain a polyurea.

In some embodiments, the outer rubber layer comprises a polythiourea.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

The present disclosure may be understood more readily by reference to the following detailed description of desired embodiments included therein, the drawings, and the appended presentation which is part of the application. In the following specification and the claims which follow, reference will be made to a number of terms which shall be defined to have the following meanings.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent can be used in practice or testing of the present disclosure. All publications, patent applications, patents, and other references mentioned herein are incorporated by reference in their entirety. The materials, methods, and articles disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases that require the presence of the named ingredients/steps and permit the presence of other ingredients/steps. However, such description should be construed as also describing compositions, mixtures, or processes as "consisting of" and "consisting essentially of" the enumerated ingredients/steps, which allows the presence of only the named ingredients/steps, along with any impurities that might result therefrom, and excludes other ingredients/steps.

Unless indicated to the contrary, the numerical values in the specification should be understood to include numerical values which are the same when reduced to the same number of significant figures and numerical values which differ from the stated value by less than the experimental error of the conventional measurement technique of the type used to determine the particular value.

All ranges disclosed herein are inclusive of the recited endpoint and independently combinable (for example, the range of "from 2 to 10" is inclusive of the endpoints, 2 and 10, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

Figure 1:
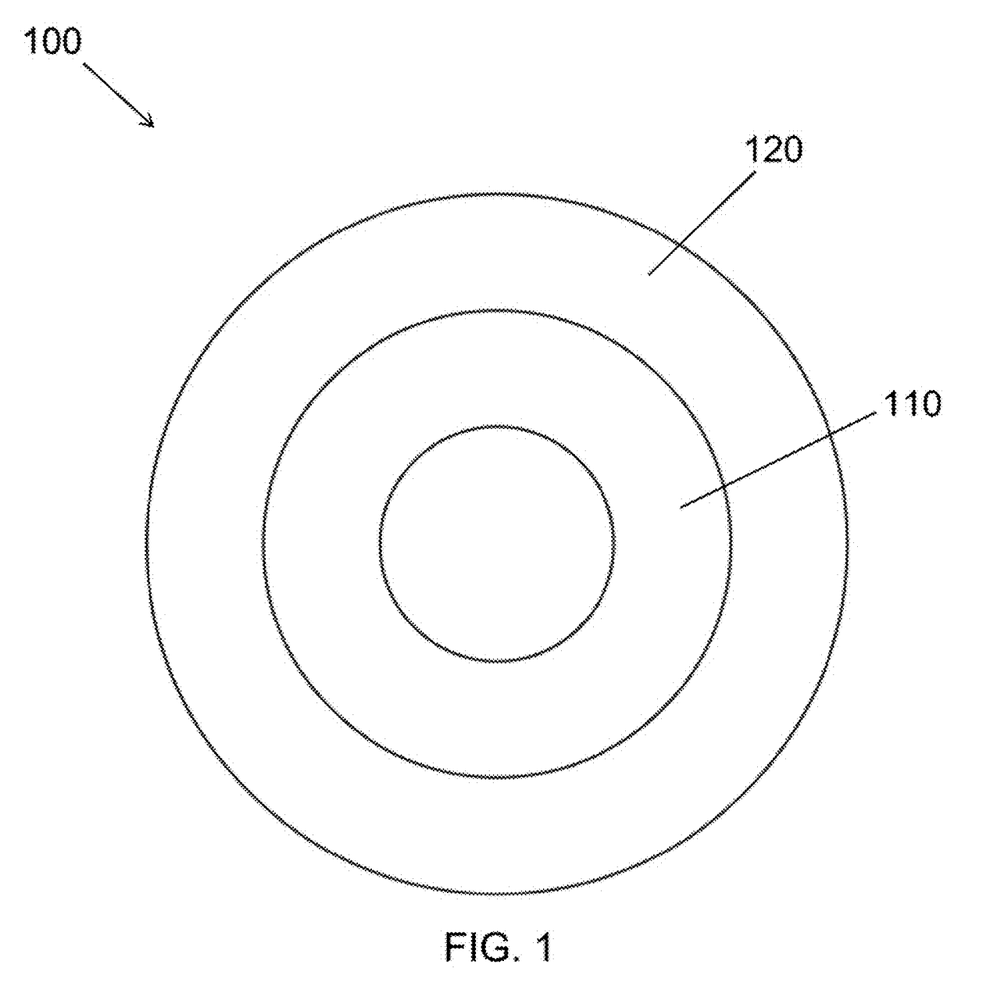
FIG. 1 is a cross-sectional view of a hose in accordance with some non-limiting embodiments of the present disclosure.

FIG. 1 is a cross-sectional view of a non-limiting embodiment of a hose 100 in accordance with some embodiments of the present disclosure. The hose 100 includes an inner rubber layer 110 and an outer rubber layer 120.

The hose may be a fuel hose and the inner rubber layer 110 may be resistant to degradation caused by fuel.

In some embodiments, the hose 100 has an inner diameter (i.e., the inner diameter of the inner rubber layer 110) of at least 0.5 inches.

The hose 100 may have an outer diameter (i.e., the outer diameter of the outer rubber layer 120) of at most 1.385 inches.

The hose may be suitable for conveying fuel wherein an internal fuel pressure is 40 psi.

Although the depicted embodiment includes two layers, it is possible to include additional layers. For example, the hose may further include an outer sheath or protective layer.

Additionally, or alternatively, it is possible to include multiple alternating layers of both the inner rubber layer material and the outer rubber layer material.

In particular embodiments, however, the hose consists of two layers.

The inner rubber layer 110 includes a first rubber material. The first rubber material may be a synthetic or natural rubber material. Non-limiting examples include latex, polyisoprene (natural or synthetic), silicone, fluoropolymers, thermoplastic elastomers, polyurethanes, and nitrile butadiene rubber (NBR).

The first rubber material may have an elastic modulus in a range of from about 10 to about 60 kPa, including from about 20 to about 40 kPa and from about 24 to about 33 kPa.

In some embodiments, the first rubber material has an ultimate stress in a range of from about 1 to about 30 MPa, including from about 3 to about 25 MPa and from about 4.5 to about 20.5 MPa.

The first rubber material may have an ultimate strain in a range of from about 200 to about 800%, including from about 250 to about 700% and from about 300 to about 650%.

In some embodiments, the first rubber material has a modulus measured at 250% elongation of less than about 10 kPa, including from about 1 to about 10 kPa, from about 2 to about 10 kPa, from about 3 to about 10 kPa, and from about 4 to about 9.5 kPa.

The first rubber material may have a glass transition temperature of less than about −20° C., including less than about −30° C., less than about −40° C., less than about −50° C., and less than about −60° C.

In some embodiments, a third rubber layer is included internal to the inner rubber layer. This third rubber layer may contain a fluoroelastomer (e.g., VITON®) or another rubber material for petroleum resistance. The wall thickness can vary from 0.032 to 0.0625 inches. In embodiments with a third rubber layer with chemical resistance, the inner rubber layer may not need to exhibit chemical resistance to the material being transported via the hose.

In some embodiments, the glass transition temperature of the first rubber material is at least about −130° C., including at least about −120° C., at least about −120° C., at least about −110° C., at least about −100° C., at least about −90° C., at least about −80° C., and at least about −70° C.

The inner rubber layer 110 may have a thickness in a range of about 0.05 to about 0.20 inches, including from about 0.055 to about 0.15 inches and from about 0.06 to about 0.125 inches.

The outer rubber layer 120 includes a second rubber material. Non-limiting examples include polyurea and polythiourea.

The second rubber material may have an elastic modulus in a range of about 500 to about 3000 kPa, including from about 1 MPa to about 2.5 MPa and about 1.2 MPa to about 2.1 MPa. The elastic modulus of the second rubber material may exceed the elastic modulus of the first rubber material.

In some embodiments, the second rubber material has an ultimate stress in a range of about 15 to about 45 MPa, including about 20 to about 30 MPa and about 22 to about 25 MPa. The ultimate stress of the second rubber material may exceed the ultimate stress of the first rubber material.

The second rubber material may have an ultimate strain in a range of about 100 to about 500%, including about 100 to about 400%, about 100 to about 300%, about 100 to about 200%, and about 105 to about 150%. The ultimate strain of the second rubber material may be less than the ultimate strain of the first rubber material.

In some embodiments, the second rubber material has an elastic limit of at least about 7 MPa.

The glass transition temperature of the second rubber material may be at least about −65° C., including at least about −55° C., and at least about −40° C. In particular embodiments, the glass transition temperature of the second rubber material is in a range of about −40 to about −20° C., including about −35 to about −25° C. The second rubber material may have a glass transition temperature in excess of the glass transition temperature of the second rubber material.

In some embodiments, the outer rubber layer 120 has a thickness in a range of about 0.2425 to about 0.3925 inches, including from about 0.2925 to about 0.3875 inches and about 0.3175 to about 0.3825 inches.

Other applications for different threat levels may require wall thicknesses up to 2 inches.

A ratio of the thickness of the outer rubber layer 120 to the thickness of the inner rubber layer 110 may be in a range of about 2.5 to about 6.5.

Figure 2:
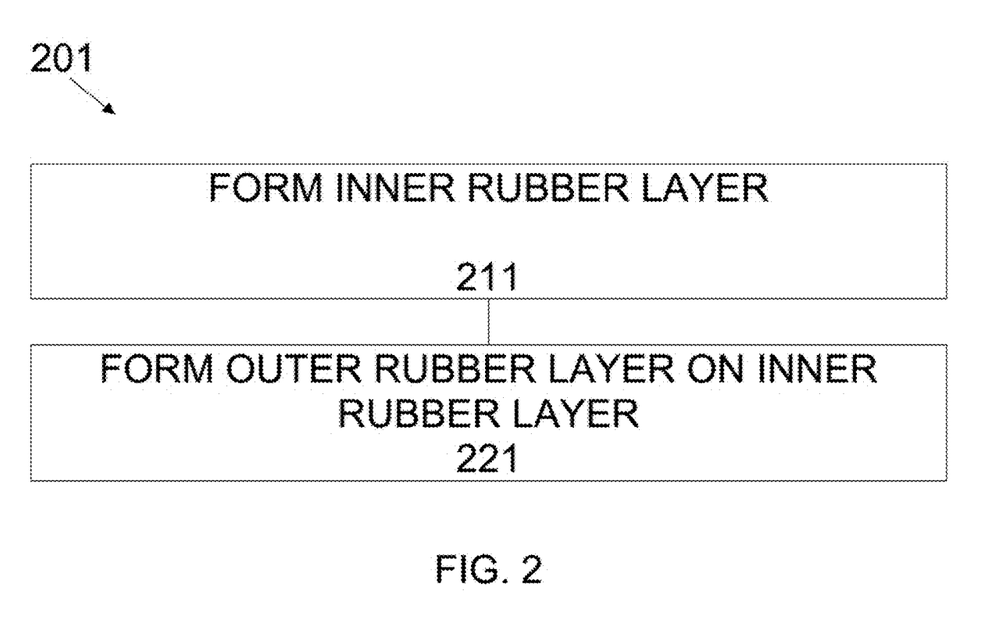
FIG. 2 is a flow chart illustrating a method for producing a hose in accordance with some embodiments of the present disclosure.

FIG. 2 is a flow chart illustrating a non-limiting example of a process 201 for forming a hose in accordance with some embodiments of the present disclosure. The process 201 includes forming the inner rubber layer 211 and applying the outer rubber layer thereon 221.

The inner rubber layer may be formed 211 by spraying, extruding or pouring. The outer rubber layer may be formed 221 on the inner rubber layer by spraying or pouring.

Non-limiting examples of spray techniques include rotisserie and mold fill. Rotisserie application may support straight hoses. In some embodiments, the inner rubber layer is placed on a rotating rod and the outer rubber material is applied by spraying the inner hose as it rotates, thereby enabling an even circular distribution. This step may be continued until the desired outside diameter is achieved. Within the mold fill using the spray technique, a large flow from the spray gun enables high flow from the spray nozzle into the mold. Many elastomers have a fast "harden to touch" rate which can be on the order of seconds. High flow rate and modularization of spray regions can enable a uniform distribution of the spray coating along the hose length. Pour forms of elastomers enable an easier approach to self-sealing hose construction. Typical cure times are much larger compared to spray elastomers (typically a minimum of 5 minutes). Longer cure times enable a single pour into a mold. The mold may be made of high-density polyethylene, optionally with a mold release coating on an internal surface of the mold.

An alternative approach to the development of self-sealing hoses is the "snap back" effect. The "snap back" effect depends on the physical properties of elastomeric materials to enable complete penetration with minimal damage to the elastomers followed by closure. The "snap back" effect is directly related to dynamic behavior of certain elastomers that experience an increase in yield strength while maintaining elongations of typically 150% or greater.

Instantaneous self-sealing performance incorporating the "snap back" effect may be achieved using polyureas. Polyureas are elastomeric co-polymers formed from the reaction of an amine ($NH_2$ group) and isocyanate. The elastomer behavior occurs from the alternating flexible polyether segments combined with hard urea segments within the polymer chain. Attributes of polyureas may include high strength (>6000 psi) and high elongation (>650%).

Variants on the polyurea can be formed through variations in the amine group as well as variation in ratios of the amine group to isocyanate where an increase in isocyanate produces harder and more brittle polyurea systems.

Heterogeneous self-sealing hose systems may include soft low modulus high elongation materials serving as an inner liner for improved self-sealing performance. The inner liners, during ballistic penetration, can support a different material response where a more compliant material supported penetration cavity plugging which supports self-sealing behavior. Physical properties including stress/strain behavior and glass phase transition temperatures ($T_g$) may be correlated to self-sealing performance.

The response to ballistic impacts can vary from a rubbery state to a more glassy state where additional damage to the elastomer penetration cavity due to brittle fracture and shear plugging. In addition, for applications where self-sealing performance is required at cold temperatures, the $T_g$ of the materials used must be below these temperatures.

The following examples are provided to illustrate the devices and methods of the present disclosure. The examples are merely illustrative and are not intended to limit the disclosure to the materials, conditions, or process parameters set forth therein.

EXAMPLES

Experimental studies were performed in three phases. The initial phase studied single entrance complete penetration of varied polyurea materials through a 0.95 cm thickness wall backed by a pressurized fluid reservoir. Elastomers capable of successfully self-sealing within this initial study were further studied within a hose configuration.

Self-sealing performance within a hose configuration incorporated an external hose diameter of 3.5 cm and an internal diameter of 1.27 cm. Homogeneous and heterogeneous systems were studied. The homogeneous hose assemblies incorporated selected polyurea elastomers from the initial single wall screening. For heterogeneous hose studies, an inner natural/synthetic rubber with an inside diameter of 1.27 cm and varied wall thickness encapsulated within a polyurea elastomer is performed. All penetrations were performed using 0.50 caliber Browning machine gun (BMG) ball rounds with a nominal incident velocity of 488 m/s.

All projectiles were launched using a smooth bore 2.54 cm barrel inside diameter light gas gun. Polycarbonate serrated self-discarding sabots were used to launch the 0.50 caliber bullets. A Shimadzu HPV-X2 high-speed video camera was used to determine both the projectile incident yaw/velocity and quantify instantaneous self-sealing performance.

Within the initial phase, a total of 12 selected polyureas incorporating varied physical properties including: modulus, elastic limit, ultimate stress and strain, and $T_g$ were studied. Elastomer targets were constructed using a 10 cm ID PVC tubing and an alignment tool to integrate molds to a 7.62 cm NPT male coupler. Based on the type of polyurea used, applications included both high- and low-pressure spray as well as pour fabrication methods. All targets were force cured over a 24-hour period at 60° C.

Prior to each test, water was filled within the chamber and an external air hose regulated to 276 kPa was connected and air pressure applied. A mild solid steel cylinder was placed behind the self-sealing target, within the pressurized fluid chamber, to arrest the projectile after complete penetration through the self-sealing target. Once the target was filled, pressurized, and leak checked, the self-sealing test was performed.

Within the second phase, homogeneous self-sealing hose studies were performed using 5 different elastomers. Elastomers selected for the homogeneous hose studies included successful sealing elastomers from the initial single layer self-sealing studies. Three of the homogeneous elastomers were based on polythiourea with varied crosslinking to enable variations in ultimate stress and strain. Polythiourea is chemically very similar to a polyurea with the replacement of the termination atom from oxygen to sulfur. The sulfur atom enables a high chemical resistance to many chemicals including fuels. The remaining two elastomers selected were polyureas (DRAGONSHIELD® and HM-VK™ [SpeciaLty Products Incorporated]). Both polyureas selected demonstrate high tensile strength and elongation as well as a low $T_g$. Initial studies did not consider $T_g$ as a performance requirement but for lower temperature applications the $T_g$ must be lower than the testing temperature by at least 10° C. to avoid brittle failure during high strain rate impacts.

Homogeneous and heterogeneous self-sealing hose targets were similarly fabricated through both spray and pour mold applications followed by a force cure. Each target hose constructed had an overall length of 20 cm. Heterogenous hose systems incorporated primarily PTU-300™ (Specialty Products, Inc.) as an outer cladding encapsulating an inner rubber hose with wall thicknesses varying from 0.16 to 0.32 cm. All hose ends of the target assemblies, prior to the force cure, were tapped to receive 0.625 cm NPT nipple (upper end) and 1.27 cm 5.12 threads/cm (lower end). Both fittings were inserted and sealed with HM-VK™ polyurea before force curing.

The hose target mounting system incorporated two 3.8 cm U-bolts to mount each target. Each hose target was mounted nominally 1 meter from the gun muzzle to enable sabot separation. Similar to initial single elastomer wall studies water, serving as a working fluid, was filled and pressurized to 276 kPa prior to testing.

Self-sealing performance was performed between 1-5 minutes after the ballistic impact. Performance measurements included 276 kPa pressurized water. A score chart was used to classify both the entrance and exit hole leakage on a scale from 0-10. A summary of the scoring system is provided in Table 1.

TABLE 1

Scoring System

| Score | Description |
|---|---|
| 0 | Complete failure/spraying water |
| 1 | Strong stream of water detached from the hose |
| 2 | Weak stream of water detached from the hose |
| 3 | Water creates an arch then reconnects with hose |
| 4 | Continuous strong stream remaining in contact with hose |
| 5 | Continuous weak stream remaining in contact with hose |
| 6 | Constant individual drops of water at a fast pace |
| 7 | Constant individual drops of water at a slow pace |
| 8 | Drops form but do not drip within 5 second of forming |
| 9 | Drops form but do not drip within 1 minute of forming |
| 10 | Complete seal |

Figure 3:
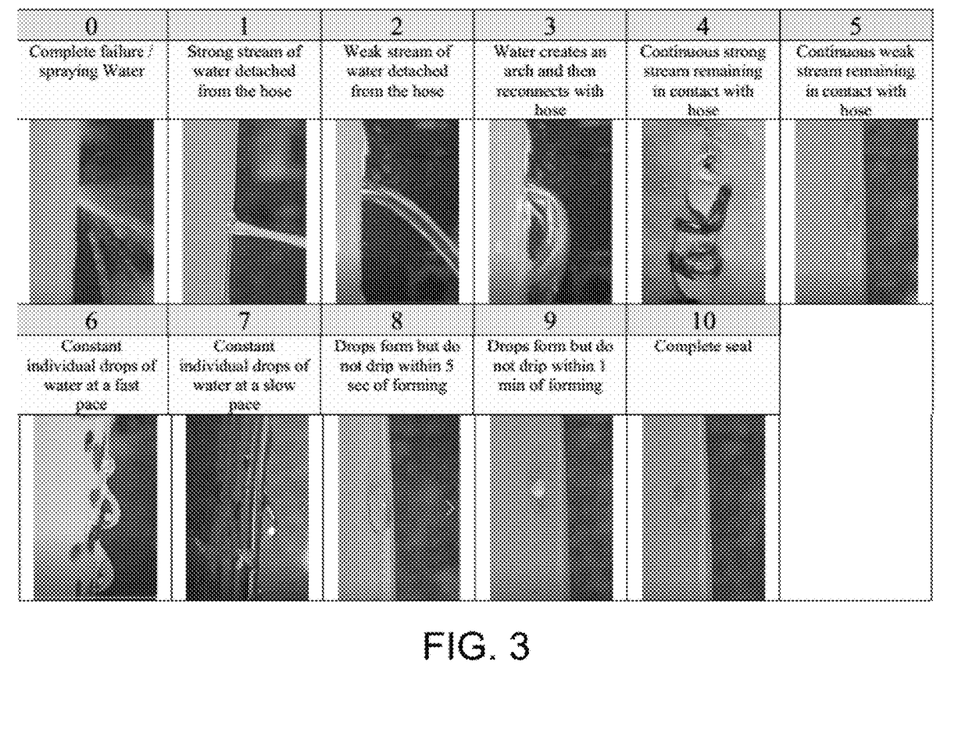
FIG. 3 is a chart with photographs of the scoring system used to measure self-sealing.

FIG. 3 is a chart including photographs of examples of quantitative scoring of the self-sealing performance on projectile entrance and exit perforations external to the hose system.

In parallel to the ballistic self-seal testing, physical properties for each elastomer were studied. During hose construction, free films for each elastomer studied were made enabling ASTM D 412 "die-C" tensile samples to be cut. Using an Instron (model 1000), physical properties including: modulus, elastic limit, and stress/strain values were measured. All tensile tests for polyurea materials were performed at a strain rate of 0.86 cm/min.

$T_g$ measurements were performed using Differential Scanning Calorimetry (DSC). $T_g$ measurements enable an understanding of the transition from the rubbery state to a harder glassy state as the temperature is decreased. A TA Instruments model Q100 was used to determine the $T_g$ temperatures for the selected elastomers. All $T_g$ measurements were cycled between −140° C. and 140° C. using a temperature rate of 10° C./min. The samples were held at −140° C. for 10 minutes and 140° C. for 1 minute isothermally.

Experimental Results

Within the initial screening, of the 12 elastomer targets, polymer materials were screened for instantaneous closure properties supporting the cladding component of a self-sealing hose system. Materials applied as a single wall entrance system that supported a complete instantaneous self-seal under pressurization were further studied within the hose configuration. Table 2 summarizes the properties of the various elastomers.

TABLE 2

Initial single wall self-sealing elastomer physical property measurements of stress/strain properties

| Elastomer | Elastic Modulus (kPa) | Ultimate Stress (MPa) | Ultimate Strain (%) |
|---|---|---|---|
| PTU-300 ™ | 2428 | 30.50 | 172 |
| HARD CAP ™ 100 | 5563 | 24.42 | 17 |
| HFM 27 | 3569 | 29.21 | 226 |
| PTU ™ | 2234 | 24.88 | 119 |
| HM-VK ™ | 588 | 22.09 | 342 |
| DRAGONSHIELD ® | 2866 | 41.85 | 441 |
| EF 1.0 Pour | 68 | 13.30 | 483 |
| EF 1.0 Spray | 13 | 6.96 | 482 |
| EPL-9 ™ Pour | 405 | 18.38 | 357 |
| EPL-9 ™ Spray | 21 | 9.45 | 353 |
| Aqua Seal Pour | 92 | 12.23 | 445 |
| Aqua Seal Spray | 12 | 6.85 | 423 |

Figure 4:
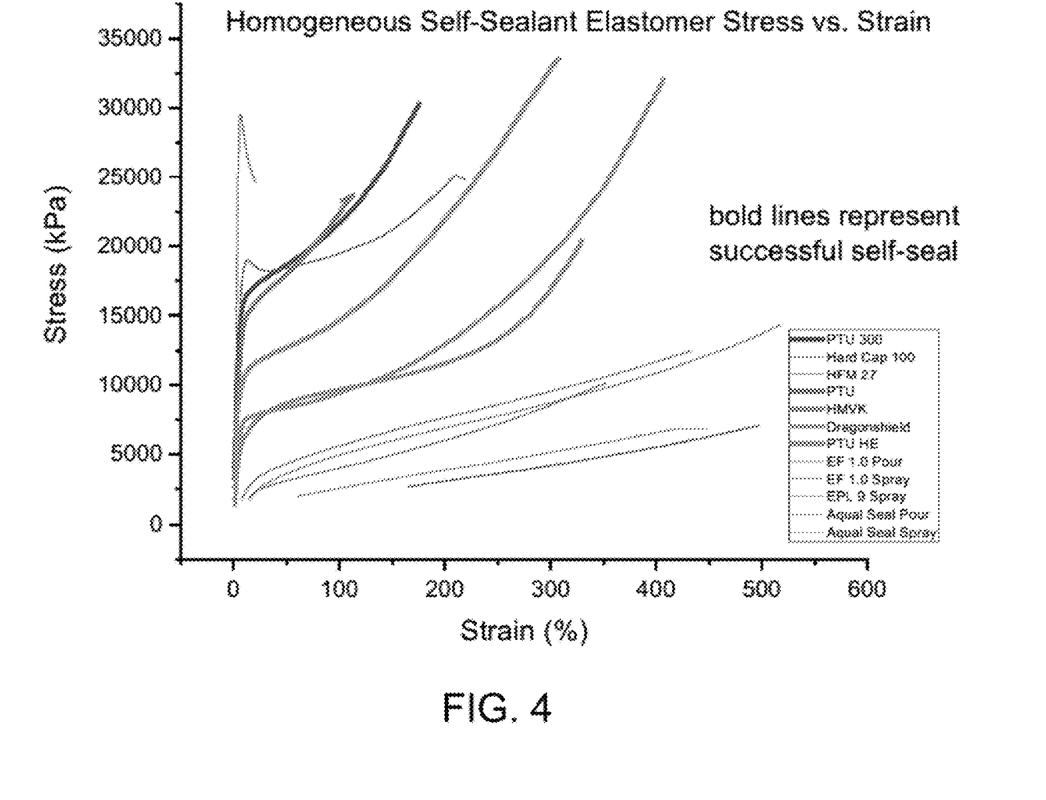
FIG. 4 is a stress versus strain graph for various outer layer elastomers discussed in the single wall testing of the Examples.

FIG. 4 presents the stress/strain curves of the 12 different polymer targets in the initial single wall self-sealing studies. The bold lines within FIG. 4 represent polymers that successfully self-sealed. Correlation of stress/strain curve characteristics to self-sealing performance were found to depend on continuous strain hardening, elastic limit and ultimate elongation. Materials including HARD CAP™ 100 (Specialty Products, Inc.) having a large elastic limit (29.5 MPa) but a low strain (21%) and EPL-9™ (Specialty Products, Inc.) having a low elastic limit (2.6 MPa) but a high elongation (350%) failed to enable self-sealing performance. Successful self-sealing performance was observed in materials having a minimum elastic limit of 7 MPa and a minimum elongation of 100%. HFM 27 (Specialty Products, Inc.) polyurea physical properties supported self-sealing performance but leakage occurred. The initial drop beyond the elastic limit, in the stress/strain curve, for HFM 27, suggests a limited chain failure. This chain failure may weaken the polymer's ability to "snap back" after penetration.

Correlation of physical properties to self-sealing performance (Table 3) suggests a dependence on continuous strain hardening, elastic limit and elongation. A total of five elastomers enabled a self-sealing performance of 8 or greater. The five elastomers were further studied within the homogeneous self-sealing studies.

TABLE 3

Initial single wall polymer self-sealing performance scoring of the initial 12 materials

| Elastomer | Self-Sealing Score |
|---|---|
| PTU-300 ™ | 9 |
| HARD CAP ™ 100 | 0 |
| HFM 27 | 7 |
| PTU ™ | 8 |
| HM-VK ™ | 10 |
| DRAGONSHIELD ® | 9 |
| PTU HE | 9 |
| EF 1.0 Pour | 0 |
| EF 1.0 Spray | 0 |
| EPL-9 ™ Spray | 0 |
| Aqua Seal Pour | 0 |
| Aqua Seal Spray | 0 |

Homogeneous Hose Self-Sealing

Homogeneous hose studies incorporated the five identified elastomers from the initial 12 polymers screened in the single wall studies (PTU-300™, PTU™, PTU HE, DRAGONSHIELD®, and HM-VK™ from Specialty Products, Inc.). For each elastomer, a series of three tests were performed including: $T_g$, stress/strain properties, and self-sealing performance.

Homogeneous Hose Elastomer $T_g$ Measurements

The majority of the elastomers incorporated within the homogeneous self-sealing hose studies exhibited a fairly low $T_g$ < −50° C. whereas both PTU™ and PTU-300™ exhibited a higher $T_g$. The lower $T_g$'s supporting material response in the rubbery phase (DRAGONSHIELD®, HM-VK™ and PTU-HE) and higher $T_g$ (PTU™ and PTU-300™) supporting a more "glassy" response. Higher $T_g$ elastomers resist more material flow during impact but exhibit shear plug damage and increased cracking within the penetration cavity.

TABLE 4

Homogeneous self-sealing hose elastomer studies measured $T_g$ values

| Elastomer | 1$^{st}$ RUN, ° C. | 2$^{nd}$ RUN, ° C. |
|---|---|---|
| HM-VK ™ | −73.3 | −73.7 |
| PTU-300 ™ | −34.2 | −31.8 |
| PTU ™ | −26.3 | −26.8 |
| PTU HE | −54.6 | −54.4 |
| DRAGONSHIELD ® | −57.3 | −60.1 |

Homogeneous Hose Elastomer Tensile Test Measurements

Figure 5:
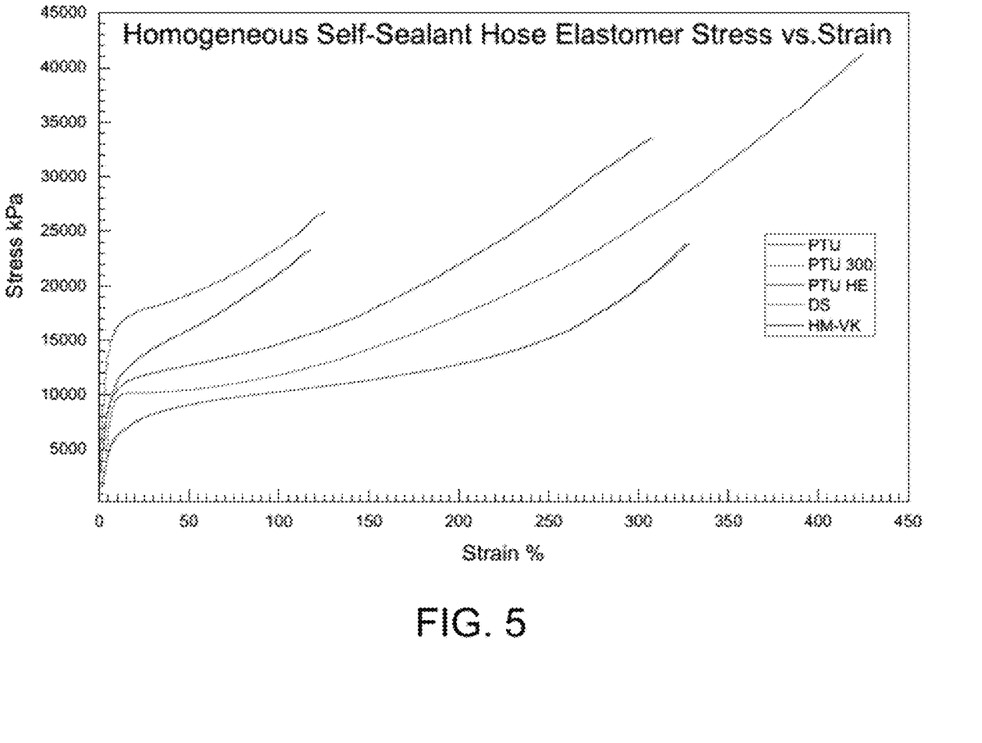
FIG. 5 is a stress versus strain graph for various outer layer elastomers discussed in the homogenous hose elastomer testing of the Examples.

Similar to the initial single layer studies "as sprayed" free films of the five different homogeneous elastomer cladding materials enabled tensile stress/strain physical properties of the five materials. Clear differences in ultimate stress and strain, as well as elastic limit/modulus, were observed between the five elastomers (Table 5, FIG. 5). Large variations in elastic modulus, ultimate stress/strain and elastic limit exist but each enabled self-sealing performance within the initial studies.

TABLE 5

Tensile strength measurements of the five selected elastomers incorporated within the homogeneous self-sealing studies. The tensile measurements represent the as tested material. Only HM-VK ™ tensile properties varied significantly from manufacturers published technical data. All data is averaged over three separate runs.

| Elastomer | Elastic Modulus (kPa) | Ultimate Stress (MPa) | Ultimate Strain (%) |
|---|---|---|---|
| PTU ™ | 1386 | 22.87 | 106 |
| PTU-300 ™ | 2034 | 24.13 | 143 |
| PTU HE | 1891 | 33.17 | 292 |
| DRAGONSHIELD ® | 2866 | 41.82 | 441 |
| HM-VK ™ | 588 | 22.09 | 342 |

Self-Sealing Performance

All scoring was performed with a water payload under pressure (276 kPa). Both the incident and exit perforations were scored separately. Typically, it was found more difficult to enable self-sealing of the exit pathway in comparison to the entrance. All of the homogeneous hose systems performed nearly the same. None of the hose systems enabled a complete self-seal solution Table 6). The best performance for the entrance penetration cavity was a slow continuous drip (7) whereas the best exit cavity seal was a fast-continuous drip (6).

Based on the studies of homogeneous self-sealing hoses, for the dimensions studied, none of the five materials enabled adequate self-sealing performance. Additional closure is required. A possible solution is through the incorporation of a low strength, compliant inner liner located within the inside diameter of the hose system.

TABLE 6

Self-sealing performance of homogeneous self-sealing hoses pressurized to 276 kPa 5 minutes after penetration

| Elastomer | Score In | Score Out |
|---|---|---|
| PTU-300 ™ | 7 | 5 |
| PTU ™ | 6 | 5 |
| PTU HE | 6 | 6 |
| HM-VK ™ | 5 | 4 |
| DRAGONSHIELD ® | 6 | 6 |

Figure 6:
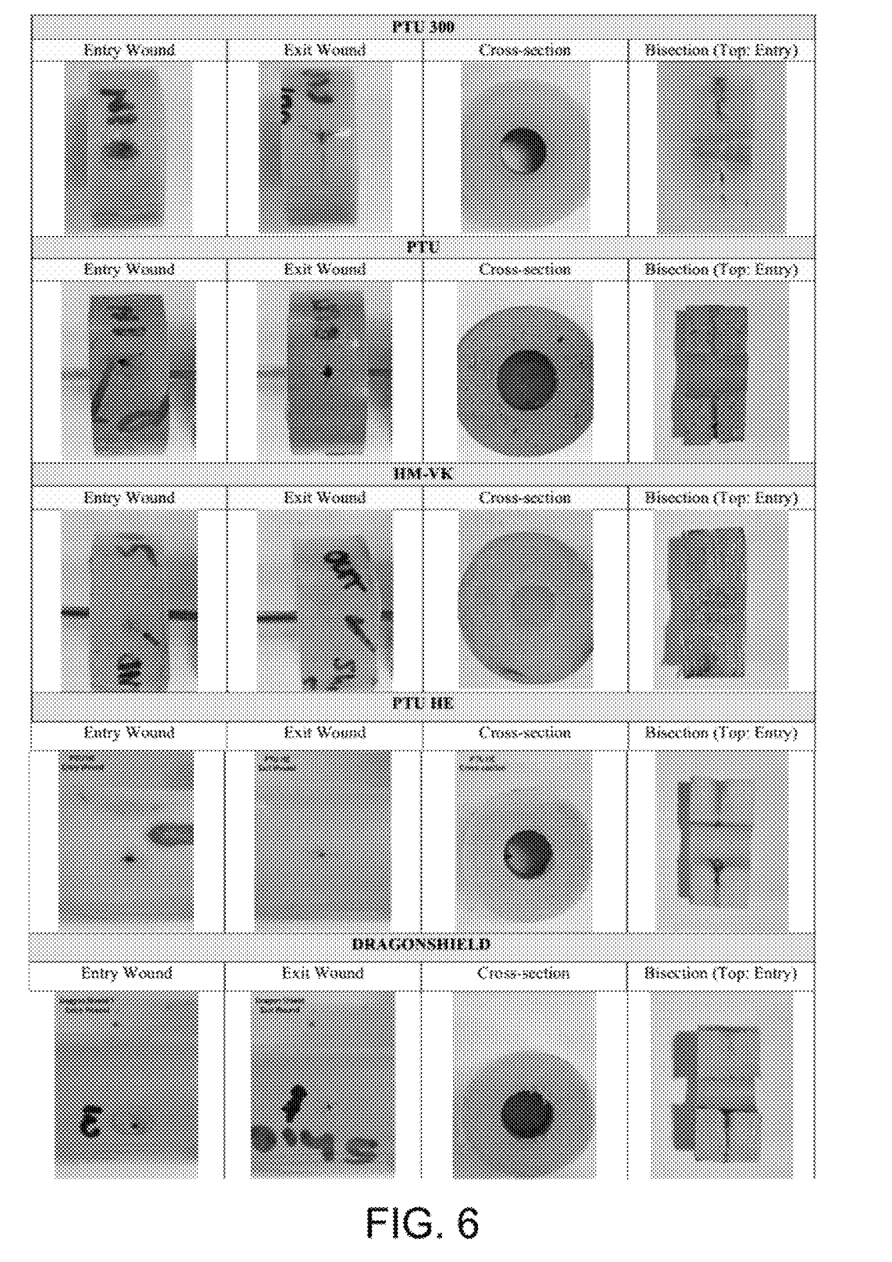
FIG. 6 is a chart containing side and cross-sectional posttest images of the homogeneous hose elastomer testing of the Examples.

FIG. 6 presents posttest images of the five homogeneous hose systems studied. Images include entrance and exit penetration cavities as well as cross sections of the hose as well as bi-section of the penetration cavity. Key observations include an increased crack propagation within the two higher $T_g$ elastomers (PTU™, PTU-300™). Within the lower glass phase transition temperatures, the cavities appeared to close in further than the higher $T_g$ samples. As much of the cavity assessment was dependent on the bisectional cut minimal correlations can be made regarding post impact penetration cavity assessments.

Based on the studies of homogeneous self-sealing hoses, for the dimensions studied, none of the five materials enabled adequate self-sealing performance. Additional closure is required. A possible solution is through the incorporation of a low strength, compliant inner liner located within the inside diameter of the hose system.

Heterogeneous Self-Sealing Hose Systems

Further investigations were performed to incorporate an inner hose system within four selected elastomers from the homogeneous self-sealing hose studies. The selected elastomers served as outer claddings for the heterogeneous self-sealing hose systems which included: DRAGONSHIELD®, PTU™, PTU-300™, and PTU HE. Initial inner liner hose screening will only be tested using PTU-300™ but the highest performing inner liner will be tested using all four of the cladding materials.

Inner hose systems included high elongation, low modulus natural and synthetic rubbers. No chemical resistance criteria was placed on the Inner hose systems, the only variables investigated were physical properties, $T_g$, and hose wall thickness.

Figure 8:
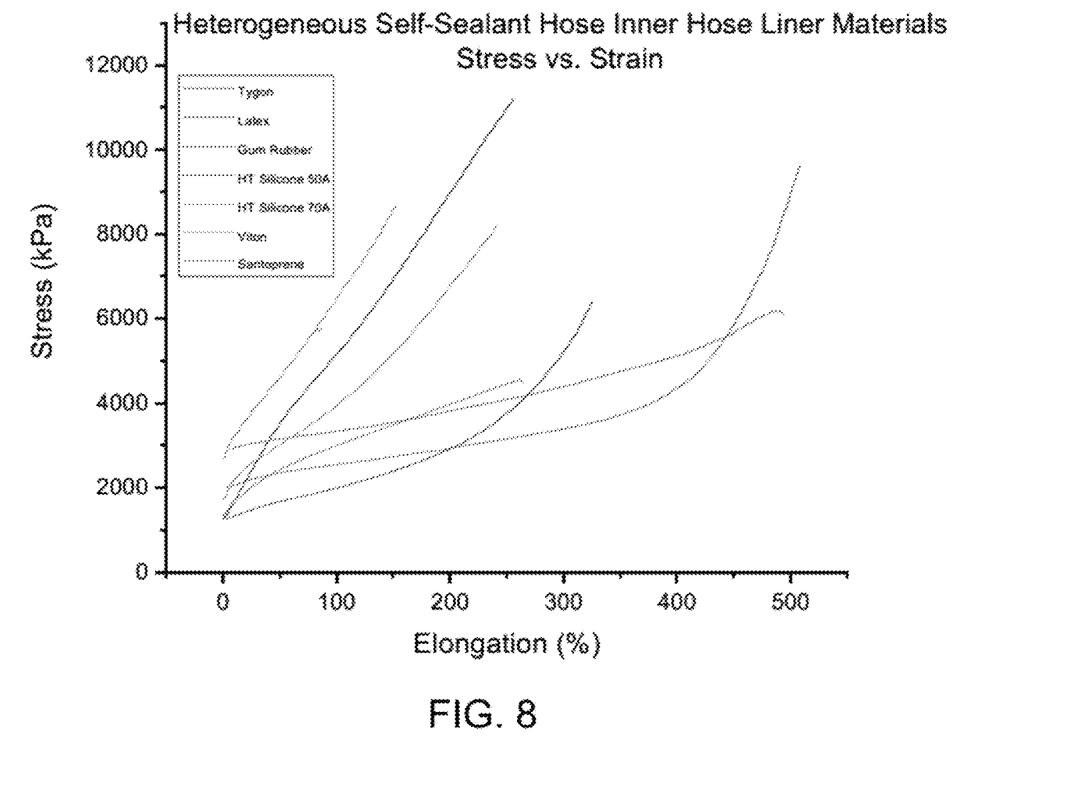
FIG. 8 is a stress versus strain graph for heterogeneous hose inner liner materials of the Examples.

The inner hose system is hypothesized to support plugging of both entrance and exit holes of the outer cladding hose after perforation. Ideal hose lining materials incorporate a low modulus (both elastic and plastic regions) and ultimate stress as well as a low $T_g$ to maintain physical properties within the rubbery state for a range of negative temperatures. Table 7 and FIG. 8 present the measured physical properties of the selected inner rubber hose systems.

Self-sealing performance of the heterogeneous hose systems demonstrated higher levels of self-sealing performance compared to the homogeneous self-sealing hoses for some of the inner liner systems. Through the incorporation of both latex and SANTOPRENE® inner hose liners with PTU-300™ as the outer cladding, both heterogeneous hose systems enabled complete self-sealing.

Within the heterogeneous self-sealing study, with the exception of VITON®, the self-sealing performance either remained the same or improved. In the case of VITON® the performance decreased. The decrease is attributed to the higher $T_g$ where under a higher strain-rate impact the hose transitions to a brittle state. Under a brittle state, material within the penetration cavity tends to shear plug as opposed to flexing. The bisectional image within FIG. 9 of VITON® exhibits a higher level of liner material transferred into the cladding component of the hose. The transfer of VITON® liner material is suspected as the cause cladding self-sealing performance. The brittle response of VITON® due to the higher $T_g$ caused shear plugging and allowed material to be forced into the penetration cavity of the cladding material.

Figure 7:
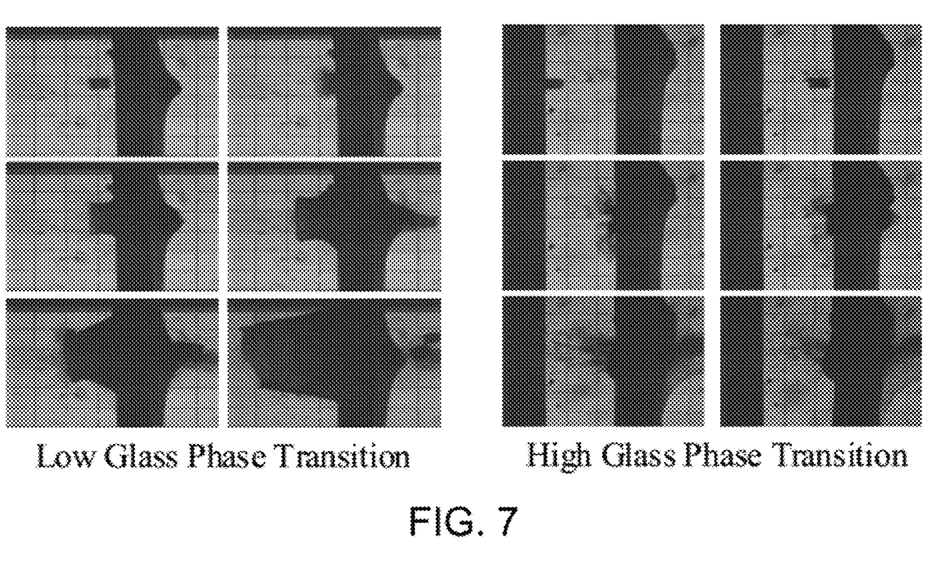
FIG. 7 includes photographs of the phase transition for low and high glass transition temperature elastomers of the Examples.

To understand the response of materials near and far away from the glass phase transition, FIG. 7 presents an example of impact results for two separate elastomers applied as front face armor systems. In both cases a flat nosed .50 caliber projectile impacts a 0.63 cm elastomer coating backed by a high strength steel substrate at velocities between 0.6 and 1 km/s. For the low $T_g$ elastomer, the material will remain within a rubbery phase and a high flow of the rubbery material occurs. Within high $T_g$ elastomers, under impact, the elastomer transitions to a glassy state and reducing the material flow. The glassy state prevents the elastomer from flowing and material remains within the flight path of the projectile increasing material brittle damage within the penetration cavity.

In the application of polymers, as front face armor systems, low $T_g$ elastomers remain within a rubbery state enabling a high flow of material. For higher $T_g$ materials the more brittle response causes more material damage within the penetration cavity.

TABLE 7

Rubber Hose Instron Data

| Elastomer | Elastic Modulus (kPa) | Ultimate Stress (MPa) | Ultimate Strain (%) | Modulus (250%) (kPa) |
|---|---|---|---|---|
| TYGON ® | 56 | 11.73 | 245 | 38.2 |
| Latex | 24 | 20.07 | 607 | 4.3 |
| Gum Rubber | 11 | 6.39 | 326 | 19.1 |
| HT Silicone (D50A) | 7 | 6.18 | 504 | 5.8 |
| HT Silicone (D70A) | 58 | 7.93 | 240 | 34.8 |
| VITON ® | 55 | 7.69 | 185 | N/A |
| SANTOPRENE ® | 33 | 4.73 | 340 | 9.4 |

TABLE 8

Published glass transition temperatures

| Sample | $T_g$ |
|---|---|
| TYGON ® | −45° C. |
| Latex | −65° C. |
| Gum Rubber | −70° C. |
| HT Silicone (D50A) | −127° C. |
| HT Silicone (D70A) | −127° C. |
| VITON ® | −17° C. |
| SANTOPRENE ® | −62° C. (brittle T, not $T_g$) |

FIG. 8 shows stress/strain curves of the inner liner hose systems incorporated within the heterogeneous self-sealing hose studies.

Tables 7 and 8 present the physical and $T_g$ properties of the seven different elastomers incorporated as inner liner materials for the heterogeneous self-sealing hose system. Through comparison of Table 9 with FIG. 8, a correlation can be made between the modulus of the inner liner elastomers at 250% elongation and the self-sealing performance. Modulus values of the inner liner under 10 kPa enabled a self-sealing performance, whereas inner liner hoses with higher modulus did not improve the self-sealing capability of the outer cladding material.

Figure 9:
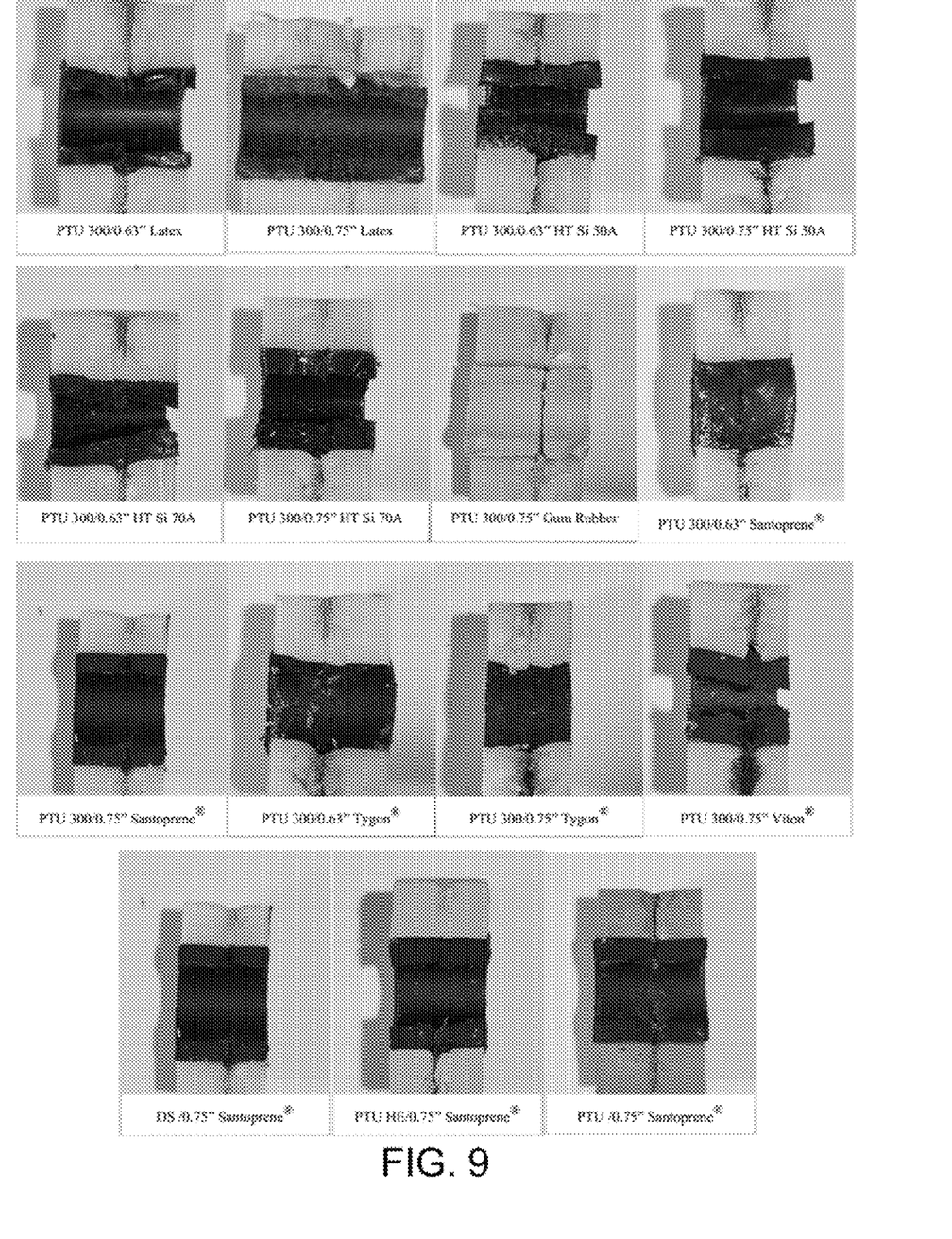
FIG. 9 includes posttest photographs of the heterogeneous hose systems of the Examples.

FIG. 9 presents bisectional images of the heterogeneous hose systems. A key general observation is the inner liner material typically shows decreased penetration cavity damage in comparison to the outer cladding materials. The only variance as mentioned previously is the VITON® inner hose that transitions to a brittle state under high strain rate.

A self-sealing hose incorporating an outer elastomer cladding and an inner soft rubber liner, with a working fluid (water) pressurized to 276 kPa, was successful in enabling a complete self-seal from an incident 0.50 caliber ogive ball round incident at 488 m/s. Performance characteristics for the outer cladding elastomers required a minimum elongation of 100% and minimum elastic limit of 7 MPa. Within the five cladding elastomers that met the minimum criteria, each cladding performed comparable to each other. Inner soft rubber liners supporting complete self-sealing require a low modulus (10 kPa @ 250% elongation) and high elongation.

Homogeneous self-sealing hose systems, using only the outer cladding material, could not enable full self-sealing performance. Penetration cavities formed within the cladding material which enabled some of the working fluid to escape. The application of the soft inner rubber liner exhibits a reduced penetration cavity. The incorporation of heterogeneous hose system enables complete self-seal For self-sealing hose systems that require operation at low temperatures, the $T_g$ value must be addressed. For self-sealing hose systems having a high $T_g$ the high strain rate from the ballistic impact can shift the elastomer into the glassy state. Within the glassy state, the compliancy of the elastomer is reduced and penetration mode of failure shifts to "shear plugging". Within "shear plugging" material is removed from the penetration cavity and greatly reducing self-sealing performance. Many elastomers support both low $T_g$ (silicone rubber −128° C.) and characteristic physical properties to support self-sealing performance.

TABLE 9

Heterogeneous hose self-sealing performance score

| Inner Layer Material | Inner Layer Internal Diameter (Inches) | Inner Layer External Outer Diameter (Inches) | Polymer Coating | Self-Sealing Score-In | Self-Sealing Score-Out |
|---|---|---|---|---|---|
| Latex | 0.50 | 0.63 | PTU-300 ™ | 5 | 5 |
| Latex | 0.50 | 0.75 | PTU-300 ™ | 10 | 10 |
| High-temp Silicone Durometer 50A | 0.50 | 0.63 | PTU-300 ™ | 6 | 6 |
| High-temp Silicone Durometer 50A | 0.50 | 0.75 | PTU-300 ™ | 7 | 10 |
| High-temp Silicone Durometer 70A | 0.50 | 0.63 | PTU-300 ™ | 5 | 5 |
| High-temp Silicone Durometer 70A | 0.50 | 0.75 | PTU-300 ™ | 5 | 5 |
| Gum Rubber | 0.50 | 0.75 | PTU-300 ™ | 7 | 6 |
| SANTOPRENE ® | 0.50 | 0.63 | PTU-300 ™ | 10 | 10 |
| SANTOPRENE ® | 0.50 | 0.75 | PTU-300 ™ | 8 | 8 |
| SANTOPRENE ® | 0.50 | 0.75 | DRAGONSHIELD ® | 10 | 7 |
| SANTOPRENE ® | 0.50 | 0.75 | PTU HE | 8 | 8 |
| SANTOPRENE ® | 0.50 | 0.75 | PTU ™ | 7 | 7 |
| TYGON ® | 0.50 | 0.63 | PTU-300 ™ | 5 | 5 |
| TYGON ® | 0.50 | 0.75 | PTU-300 ™ | 7 | 5 |
| VITON ® | 0.50 | 0.75 | PTU-300 ™ | 0 | 0 |
| VITON ® | 0.50 | 0.75 | PTU-300 ™ | 2 | 2 |

This written description uses examples to describe the disclosure, including the best mode, and also to enable any person skilled in the art to make and use the disclosure. Other examples that occur to those skilled in the art are intended to be within the scope of the present disclosure if they have structural elements that do not differ from the same concept, or if they include equivalent structural elements with insubstantial differences. It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A self-sealing hose comprising:
an inner rubber layer comprising a first rubber material; and
an outer rubber layer comprising a second rubber material;
wherein the second rubber material has an ultimate strain of at least 100% and an elastic limit of at least about 7 MPa; and
wherein the first rubber material has a modulus measured at 250% elongation of less than about 10 kPa.

2. The self-sealing hose of claim 1, wherein a glass transition temperature of the first rubber material is less than about −20° C.

3. The self-sealing hose of claim 1, wherein the second rubber material comprises a polyurea.

4. The self-sealing hose of claim 1, wherein the second rubber material comprises a polythiourea.

5. The self-sealing hose of claim 1, wherein the second rubber material has an elastic modulus in a range of about 500 kPa to about 3,000 kPa.

6. The self-sealing hose of claim 1, wherein the second rubber material has an ultimate stress in a range of about 15 to about 45 MPa.

7. The self-sealing hose of claim 1, wherein the ultimate strain is in a range of 100% to about 500%.

8. The self-sealing hose of claim 1, wherein the second rubber material has a glass transition temperature of at least about −65° C.

9. The self-sealing hose of claim 1, wherein the self-sealing hose consists of the inner rubber layer and the outer rubber layer.

10. The self-sealing hose of claim 1, wherein the inner rubber layer is in direct physical contact with the outer rubber layer.

11. The self-sealing hose of claim 1, wherein the first rubber material comprises a latex.

12. The self-sealing hose of claim 1, wherein the first rubber material comprises a vulcanized ethylene propylene diene monomer (EPDM) rubber in a thermoplastic matrix of polypropylene.

13. The self-sealing hose of claim 1, wherein the first rubber material comprises a latex or a vulcanized EPDM rubber in a thermoplastic matrix of polypropylene; and wherein the second rubber material comprises a polyurea or a polythiourea.

14. The self-sealing hose of claim 1, wherein an inner diameter of the hose is at least about 0.5 inches; and wherein the outer diameter of the hose is less than or equal to about 1.385 inches.

* * * * *